United States Patent
Kierat et al.

(10) Patent No.: US 10,065,887 B2
(45) Date of Patent: Sep. 4, 2018

(54) FIBERS, METHODS FOR THEIR PREPARATION AND USE IN THE MANUFACTURE OF REINFORCED ELEMENTS

(71) Applicant: Construction Research & Technology, GmbH, Trostberg (DE)

(72) Inventors: Radoslaw Kierat, Altenmarkt (DE); Bernhard Feichtenschlager, Traunstein (DE); Christoph Hesse, Ebersberg (DE); Dunja Hirsemann, Shanghai (CN)

(73) Assignee: Construction Research & Technology, GmbH, Trostberg (DE)

( * ) Notice: Subject to any disclaimer, the term of this patent is extended or adjusted under 35 U.S.C. 154(b) by 180 days.

(21) Appl. No.: 14/912,371

(22) PCT Filed: Aug. 21, 2014

(86) PCT No.: PCT/EP2014/067807
§ 371 (c)(1),
(2) Date: Feb. 16, 2016

(87) PCT Pub. No.: WO2015/028380
PCT Pub. Date: Mar. 5, 2015

(65) Prior Publication Data
US 2016/0194245 A1 Jul. 7, 2016

(30) Foreign Application Priority Data
Aug. 27, 2013 (EP) .................... 13181760

(51) Int. Cl.
*C04B 20/00* (2006.01)
*C04B 22/00* (2006.01)
(Continued)

(52) U.S. Cl.
CPC ........ *C04B 20/0048* (2013.01); *C04B 20/023* (2013.01); *C04B 20/1055* (2013.01);
(Continued)

(58) Field of Classification Search
CPC .............. C04B 20/0048; C04B 20/023; C04B 22/0086; C04B 20/1055; C04B 28/04; D06M 11/00; D06M 11/44; E04C 5/073
See application file for complete search history.

(56) References Cited

U.S. PATENT DOCUMENTS

| | | |
|---|---|---|
| 5,156,996 A | 10/1992 | Valenti |
| 5,705,233 A | 1/1998 | Denes et al. |

(Continued)

FOREIGN PATENT DOCUMENTS

| | | |
|---|---|---|
| DE | 29 45 875 A1 | 8/1981 |
| DE | 36 02 310 A1 | 8/1986 |

(Continued)

OTHER PUBLICATIONS

Machine translation of DE 2945875 (Year: 1981).*
(Continued)

*Primary Examiner* — John E Uselding
(74) *Attorney, Agent, or Firm* — Curatolo Sidoti Co., LPA; Joseph G. Curatolo; Salvatore A. Sidoti

(57) ABSTRACT

Fibers with crystallization seeds attached to its surface, method of making such composite fibers by surface treatment of fibers followed by either treating such fibers with premade crystallization seeds or by precipitation and direct crystallization of seeds onto pretreated fibers. Controlling and tuning the properties of inorganic binder compositions with fiber-bound crystallization seeds and thereby generating inorganic binder compositions with tailor-made characteristics.

23 Claims, 4 Drawing Sheets

(51) Int. Cl.
| | |
|---|---|
| C04B 20/02 | (2006.01) |
| C04B 20/10 | (2006.01) |
| E04C 5/07 | (2006.01) |
| D06M 11/00 | (2006.01) |
| D06M 11/44 | (2006.01) |
| D06M 11/45 | (2006.01) |
| D06M 11/56 | (2006.01) |
| D06M 11/79 | (2006.01) |
| D06M 13/513 | (2006.01) |
| D06M 15/233 | (2006.01) |
| D06M 15/263 | (2006.01) |
| D06M 15/27 | (2006.01) |
| D06M 15/347 | (2006.01) |
| D06M 23/08 | (2006.01) |
| C04B 28/04 | (2006.01) |
| D06M 101/06 | (2006.01) |
| D06M 101/24 | (2006.01) |

(52) U.S. Cl.
CPC ...... *C04B 20/1074* (2013.01); *C04B 22/0086* (2013.01); *C04B 28/04* (2013.01); *D06M 11/00* (2013.01); *D06M 11/44* (2013.01); *D06M 11/45* (2013.01); *D06M 11/56* (2013.01); *D06M 11/79* (2013.01); *D06M 13/513* (2013.01); *D06M 15/233* (2013.01); *D06M 15/263* (2013.01); *D06M 15/27* (2013.01); *D06M 15/347* (2013.01); *D06M 23/08* (2013.01); *E04C 5/073* (2013.01); *D06M 2101/06* (2013.01); *D06M 2101/24* (2013.01); *D06M 2200/50* (2013.01); *Y02W 30/97* (2015.05)

(56) References Cited

U.S. PATENT DOCUMENTS

| | | |
|---|---|---|
| 5,731,080 A | 3/1998 | Cousin et al. |
| 5,786,080 A | 7/1998 | Andersen et al. |
| 8,653,186 B2 | 2/2014 | Nicoleau et al. |
| 2008/0108732 A1 | 5/2008 | Wieland et al. |
| 2011/0269675 A1 | 11/2011 | Nicoleau et al. |
| 2012/0146254 A1 | 6/2012 | Kaufmann et al. |

FOREIGN PATENT DOCUMENTS

| | | |
|---|---|---|
| EP | 0 225 036 A1 | 6/1987 |
| EP | 2 557 185 A1 | 2/2013 |
| GB | 2 170 234 A | 7/1986 |
| WO | WO 97/39054 | 10/1997 |
| WO | WO 2008/052753 A2 | 5/2008 |
| WO | WO 2010/026155 A1 | 3/2010 |

OTHER PUBLICATIONS

Kim, et al., "Performance of Bridge Deck Link Slabs Designed With Ductile Engineered Cementitious Composite", ACI Structural Journal, Nov.-Dec. 2004, pp. 792-801, vol. 101, No. 6.

Li, et al., "Interface Property Characterization and Strengthening Mechanisms in Fiber Reinforced Cement Based Composites", Advanced Cement Based Materials, Jun. 1997, pp. 1-20, vol. 6, Issue 1. Abstract only.

Sun, M., at al., "Influence of Corrosion on the Interface Between Zinc Phosphate Steel Fiber and Cement", Materials and Corrosion, Jan. 1, 2012, pp. 67-72, vol. 63, No. 1. Abstract only.

R.N. Swamy, "Fibre Reinforcement of Cement and Concrete", Matériaux et Construction, May 1975, pp. 235-254, vol. 8, Issue 3. Abstract only.

PCT/EP2014/067807—International Search Report, dated Jan. 16, 2015.

PCT/EP2014/067807—International Written Opinion, dated Jan. 16, 2015.

Sun, M., et al., "Influence of Corrosion on the Interface Between Zinc Phosphate Steel Fiber and Cement", Materials and Corrosion, Jan. 1, 2012, pp. 67-72, vol. 63, No. 1.

* cited by examiner

FIBERS, METHODS FOR THEIR PREPARATION AND USE IN THE MANUFACTURE OF REINFORCED ELEMENTS

CROSS REFERENCE TO RELATED APPLICATIONS

This application is a national stage application of International Application No. PCT/EP2014/067807, filed 21 Aug. 2014, which claims priority from European Patent Application No. 13181760.3, filed 27 Aug. 2013, which applications are incorporated herein by reference.

FIELD OF INVENTION

The present invention relates to the field of fiber-based products. Said fibers have crystallization seeds attached to their surface thereby affecting the mechanical strength and ductility of inorganic binder compositions such as cementitious or calcium sulfate-based systems.

BACKGROUND OF THE INVENTION

Building and construction materials based on hydraulic and non-hydraulic binders are examples where composite fibers are employed to modulate the physical properties according to specific needs. Concrete and mortar are relatively brittle materials where the tensile strength is typically much lower compared to the compressive strength of the material. Therefore, under normal circumstances concrete needs to be reinforced usually with steel reinforcing bars. It has become increasingly popular to additionally reinforce concrete or mortar with short randomly distributed fibers of various types to satisfy the needs of modern building industry. The main purpose is not only to increase the toughness (resistance to cracking) of the resulting inorganic binder compositions, but also to improve the tensile strength (crack strength) and ductility of the building materials.

Mortar is a mixture of fine aggregates with hydraulic cement, whereas concrete additionally contains coarse aggregates. The cement constituent is used as a synthetic inorganic material making up the matrix into which the aggregates are embedded. Concrete and mortar mixtures may also contain pozzolans and other admixtures commonly utilized for conventional and specialty uses thereby modifying the physical properties of the unhardened and hardened inorganic binder compositions. Cement typically includes anhydrous crystalline calcium silicate ($C_3S$ and $C_2S$), lime and alumina. In the presence of water the silicates react to form hydrates and calcium hydroxide. The hardened structure of cement depends on a three dimensional nature and complex arrangement of newly formed crystals that intrinsically depends on the quantities of the ingredients, curing time and composition of the concrete aggregates. In the course of the hardening process plastic, chemical or dewatering shrinkage may create voids causing defects and shrinkage cracks. Moreover sulfate attack in concrete and mortar often is the cause of internal pressure producing cracks in the material and in consequence destabilizes structures made of such material. Sulfate attack can be either 'external' or 'internal', i.e. due to penetration of external sulfates in solution into the concrete or due to a soluble source being incorporated into the concrete at the time of mixing for example. The more common type of sulfate attack is external and typically occurs by penetration of water containing dissolved sulfate. The changes caused by external sulfate attack may vary in type or severity but commonly include extensive cracking and loss of bond between the cement paste and aggregate most likely due to crystallization of ettringite. The effect of these changes is an overall loss of concrete strength. Internal sulfate attack on the other hand occurs where a source of sulfate is found in one of the concrete ingredients. This may occur through the use of sulfate-rich aggregate, excess of gypsum added to the cement or by contamination. Under special circumstances such as elevated temperatures during hardening of concrete ettringite crystallization causes expansion and cracking of the matrix and subsequently serious damage to the concrete structures.

In the process of counteracting potential defects fibers have been introduced to the inorganic binder compositions to reinforce the final matrices. Interfacial bond strength governs many important composite properties, such as overall composite strength, ductility, energy absorption property etc. Many endeavors have been undertaken to enhance or increase the bonding capacity and compatibility at the interface of fibers to matrices in various composite materials and concrete in particular. A variety of fibers, natural and synthetic, have been used in inorganic binder compositions to increase the stability of resulting structural elements made for example from concrete mixtures. A non-limiting list of examples for such fibers are from natural materials, such as cellulose-based fibers, like cotton, viscose, hemp, jute, sisal, abaca, bamboo, cellulose, regenerated cellulose (e.g. Lyocell®), from synthetic materials like polyamide, polyester, polyacrylonitrile, polypropylene, polyethylene, polyvinylalcohol, aramide, polyolefines in general, but also from inorganic mineral or metal-based materials like carbon, glass, mineral wool, basalt, oxide ceramic and steel.

Fibers of various shapes and sizes produced from such materials are being used as stabilizers and reinforcing elements, however, for most applications such as structural and nonstructural purposes, steel fibers are most commonly used. Fibers are usually randomly oriented in the matrix. Examples of commonly used synthetic fibers are polypropylene, polyethylene and polyvinyl alcohol, all of which suffer from one or more problems, such as high cost (e.g. polyvinylalcohol), low tenacity or low interfacial bonding (e.g. polypropylene).

When concrete or mortar mixtures contain fibers there is a considerable improvement of post-cracking behavior. Compared to plain concrete, fiber reinforced concrete is much tougher and impact resistant. Plain concrete fails suddenly once the deflection corresponding to the ultimate flexural strength is exceeded. Fiber reinforced concrete continues to sustain considerable loads even in excess of fracture deflection of plain concrete. This is due to the fact that fibers significantly alter the energy absorption properties of the inorganic binder compositions. (Swamy R N et al., Materiaux et Constrctions Vol. 8, 45, 235-254, 1975; Kim, Y Y et al., ACI Structural Journal, Vol. 101, 6, 792-801, 2004; EP 0,225,036; EP 2,557,185). The most outstanding property of the inorganic binder compositions is the potential for crack arrest and crack control mechanisms. This further directly affects the improvement of other properties linked to cracking such as strength, stiffness, ductility, fatigue, thermal loading, resistance to impact and energy absorption. Crack-control therefore seems to be the most important aspect when considering reinforcement of cementitious based inorganic binder compositions.

A limitation in the use of most fibers as reinforcement agents is a result of the low pull-out strength based on poor wettability and adhesion to the matrix (low interfacial bonding) and to cementitious material in particular. Failure of fiber-reinforced concrete is primarily due to fiber pull-out or de-bonding. Therefore failure of fiber reinforced concrete will not occur suddenly after initiation of a crack. Since the bonding of fibers to the matrix is mainly mechanical, literature indicates that to obtain good adhesion between fiber and matrix material it is usually necessary to carry out pretreatments, chemically as well as physically. A variety of mechanisms are known and described in the literature and are employed to increase the interfacial bonding of fibers to inorganic binder compositions (Li V. C. et al., Advanced Cement Based Materials, 1997, Vol. 6, 1-20). Increasing the fiber surface area is for example one way to increase the area of interaction between fiber and matrix. This increase in surface area enhances the mechanical bond to the matrix and can for example be achieved by fibrillation procedures. Further surface modulations of fibers have been utilized that lead to improvement of matrix-fiber interaction and mechanical bonding such as twisting, embossing crimping and introduction of hooks into fibers to mention a few measures generally employed.

Other means of surface modification also lead to enhancement of adhesion between fiber and matrix. Plasma treatment is utilized to introduce polar groups onto the surface thereby increasing the reactivity and wettability of the fiber (U.S. Pat. No. 5,705,233). This leads to an improved compatibility and bonding to cementitious matrix ultimately resulting in increased pull-out strength of the respective fibers.

Special techniques have been developed to increase the mechanical bond to the matrix and assure advantageous composite properties. The geometry of the fiber influences the bond between the fiber and matrix structure, e.g. fibers of three dimensional shape demonstrate improved bonding properties (Naaman A. E., Mcgarry F. J., Sultan, J. N.—Developments in fiber-reinforcements for concrete, Technical Report, R 72-28, School of Engineering, MIT, May 1972, p. 67).

Synthetic fibers offer a number of advantages as reinforcement agents in concrete. They present high elastic modulus and are cheap. EP 0,225,036 discloses a method of making polypropylene fibers antistatic and thus increasing the hydrophilicity whereby the embedding of the fibers in the matrix and uniform distribution is improved. Further disclosed are methods for improving the embedding properties of polypropylene fibers by crimping, roughening or profiled shaping of the fibers.

WO 97/39054 discloses individual fiber bodies having ettringite formed on at least a portion of their surface. Ettringite crystals are precipitated in situ within an aqueous medium onto the surface of hard wood fibers in order to improve the compatibility of the utilized wood fiber within a hydraulic matrix. Further disclosed is the use of the wood fibers to reinforce inorganic binder compositions and to enhance bond strength between the fibers and cementitious matrices.

DE 3602310 discloses the pretreatment of individual fiber bodies with silicic acid aerosol particles (silica fume). The amorphous silica fume particles are deposited on the fiber surface from an aqueous dispersion in the presence of dispersants prior to using the fiber in cementitious binder systems. In partucluar DE 3602310 discloses the use of silica fume particles to prevent direct interaction of cement hydrate products with the fiber and thereby prevent or reduce ageing and/or deterioration of the fiber in the resulting composite material. Despite the measures employed to increase the bonding of fibers to the matrix the utilization of individual fiber types are still limited because for high-tech and demanding applications the respective pull-out strength is still low and insufficient to satisfy the needs of high performance concrete materials. Further, individual techniques available are restricted to only limited fiber materials, i.e. solely to mineral-based, polymer-based or even only to a selected, individual material species thereby limiting the general and widespread use of individual techniques.

The hydrophobicity of a variety of fibers for example and respective low wettability and hence low adhesion to cement matrix is one of the major problems that prevent widespread and large scale use of cheap polymeric material such as polypropylene.

It would therefore be favorable to have a method at hand to easily modify and further improve the bonding characteristics of such fibers to a construction or building materials, in particular that of polypropylene fibers in non-hydraulic and hydraulic inorganic binder compositions. The problem to be solved by the present invention is to provide means to increase the pull-out strength of fibers used in building and construction materials based on non-hydraulic, latent hydraulic and hydraulic binders and so enhance strength and flexibility with sustained mechanical stability of said materials.

SUMMARY OF THE INVENTION

We have discovered a solution to this problem by providing fibers that have attached to their surface crystallization seeds. Fiber-surface modification to increase the bonding to the inorganic binder matrix is achieved by the inventive process. The inventive fibers lead to a chemical bond between fiber and inorganic binder matrix and an altered structure of the inorganic binder material close to the interface with respective increase in pull-out strength, ultimately strengthening and toughening the inorganic binder compositions, and of concrete and mortar in particular.

It is understood that "inorganic binder" comprises hydraulic binders such as standard cements as defined by various national standards and classification systems, for example as under the European Standard EN 197 or the ASTM C150 that is used primarily in the United States of America. EN 197 defines cement types CEM I, II, III, IV, and V. Hydraulic binders require water to harden and develop strength. Hydraulic binders can also harden under water. CEM I is a Portland cement, comprising Portland cement and up to 5% of minor additional constituents. CEM II is a Portland-composite cement, comprising Portland cement and up to 35% of other single constituents. CEM III is a blast furnace cement, comprising Portland cement and higher percentages of blast furnace slag. CEM IV is a pozzolanic cement, comprising Portland cement and higher percentages of pozzolana. CEM V is a composite cement, comprising Portland cement and higher percentages of blast furnace slag and pozzolana or fly ash. Further, it is understood that latent hydraulic binders are also encompassed by the term "inorganic binder". Latently hydraulic binders do not bind directly when mixed with water. In order to initiate the hydration or hardening process, it is necessary to activate latent hydraulic materials in mortar or concrete formulations for example by mixing with non-hydraulic lime thereby forming a hydraulic cement. Hydraulic or latent hydraulic binders are also encompassed by the term "cementitious material". Further, it is understood that non-hydraulic binders are also encompassed by the term "inorganic binder". Non-hydraulic binders can only harden in the presence of air, meaning that such non-hydraulic binders cannot harden under water. Common non-hydraulic binders are high calcium or magnesium lime as well as gypsum.

A first aspect of the invention concerns a plurality of individual fiber bodies having attached to the surface of such individual fiber-bodies crystallization seeds. "Attached" to the surface is understood to describe a stable bond between fiber body surface and crystallization seeds via chemical, ionic or physical interaction. Such stable bond may also be circumscribed by the terms "to be linked", "to be bound", "anchored to" or "link", "bind" or "anchor" in the context of the disclosed invention. The attachment of the crystallization seeds to the fiber bodies may further be facilitated by an intermediate molecule or intermediate molecules functioning as stabilizer, linker and/or anchor components fixing the crystallization seeds to the fiber body.

The invention further concerns a method for the preparation of a plurality of individual fiber bodies having attached to the surface of such individual fiber bodies crystallization seeds, wherein the individual fiber body surface is modified such that crystallization seeds readily are linked, adhere to or bind to said individual fiber-bodies. The term "fiber" or "modified fiber" may be substituted for "a plurality of individual fiber-bodies having attached to the surface of such individual fiber-bodies crystallization seeds". The fibers may be in monofilamentous form, collated fibers, fibrillated, ribbon-like or core-sheath, core-shell, mono-, bi- or multicomponent, mixed or blended in an extruder, coextruded or composite, or any other form known in the art.

Further the invention relates to the use of a plurality of individual fiber-bodies having attached to the surface of such individual fiber-bodies crystallization seeds to modify the mechanical properties of an inorganic binder composition. Such a modified fiber containing binder composition may also be encompassed by the term "fiber-reinforced" binder composition.

A further aspect of the invention concerns a method for the enhancement of bonding between fibers and inorganic binder matrix characterized by use of plurality of individual fiber-bodies having attached to the surface of such individual fiber-bodies crystallization seeds.

Further, the invention relates to a inorganic binder composition, comprising a inorganic binder matrix material selected from the group consisting of inorganic binder systems, composite materials, preferably, hydraulic, latent hydraulic and non-hydraulic binders, and a plurality of individual fiber-bodies having attached to the surface of such individual fiber-bodies crystallization seeds.

An aspect of the invention also relates to a inorganic binder composition comprising a inorganic binder matrix material selected from the group consisting of inorganic binder systems, composite materials, preferably hydraulic, latent hydraulic and non-hydraulic binders, and a plurality of individual fiber-bodies having attached to the surface of such individual fiber-bodies crystallization seeds, wherein in said plurality of individual fiber-bodies, said individual fiber-bodies are separated from each other.

Another aspect of the invention concerns the inorganic binder composition comprising a inorganic binder matrix material selected from the group consisting of inorganic binder systems, composite materials preferably hydraulic, latent hydraulic and non-hydraulic binders, and a plurality of individual fiber-bodies having attached to the surface of such individual fiber-bodies crystallization seeds, wherein in said plurality of individual fiber-bodies, fiber-bodies are selected from at least one of cellulose-based fibers like cotton, viscose, hemp, jute, sisal, abaca, bamboo, cellulose, regenerated cellulose (e.g. Lycocell®), mineral-based fiber like carbon, glass, mineral wool, basalt, oxide ceramic, metal-based fiber, steel, or synthetic polymer fibers selected from polyamide, polyester, polyvinylalcohol, aramide or the group of polyolefines consisting of polyethylene, polypropylene, polyoxymethylene, poly(vinylidine fluoride), poly (methyl pentene), poly(ethylene-chlorotrifluoroethylene), poly(vinyl fluoride), poly(ethylene oxide), poly(ethylene terephthalate), poly(butylenterephthalate) and polybutene or any mixtures thereof.

Preferably the invention relates to a inorganic binder composition comprising a inorganic binder matrix material selected from the group consisting of inorganic binder systems, composite materials, preferably, hydraulic, latent hydraulic and non-hydraulic binders, and a plurality of individual fiber-bodies having attached to the surface of such individual fiber-bodies crystallization seeds, wherein in said plurality of individual fiber-bodies, said at least one synthetic polymer is polypropylene or polyvinylalcohol.

Furthermore the invention relates to a inorganic binder composition comprising a inorganic binder matrix material selected from the group consisting of inorganic binder systems, composite materials, preferably hydraulic, latent hydraulic and non-hydraulic binders, and a plurality of individual fiber-bodies having attached to the surface of such individual fiber-bodies crystallization seeds, wherein said inorganic binder composition is a cementitious material or a gypsum-based material.

The invention also concerns a inorganic binder composition as described above further comprising defoamers, air entrainers, set retarders, shrinkage reducers, redispersible powders, hardening accelerators, anti-freezing agents, plasticizers, water reducers, corrosion inhibitors and/or anti-efflorescence agents or mixtures thereof.

An advantage of the invention is being capable of endowing enhanced mechanical stability to a structure reinforced with a plurality of individual fiber-bodies as described above.

Another advantage of the invention is in that the structure may further be made of a material selected from a non-hydraulic material, plaster material, gypsum or hydraulic material, a cementitious material, a mortar, concrete.

A particular aspect of the invention is a structure made of plaster, stucco, concrete or mortar containing or having incorporated inventive fibers as described herein. The structures containing or having incorporated inventive fibers can also be viewed as "fiber reinforced" structures, wherein the inventive fibers convey physical properties to the structure that make such structures more resistant to physical stress, such as cracking, tension, strain or the like.

Further aspects of the invention are ductile, crack-resistant, high tensile strength shaped articles comprising the inventive fiber-reinforced concrete composite.

DETAILED DESCRIPTION OF THE INVENTION

Many fibers, in particular hydrophobic fibers, basically have poor interfacial bond strength with inorganic binder systems. This is a severe limitation to the effective use of a variety of polymer fibers in high performance inorganic binder based composites, especially for readily available and cheap fibers such as polypropylene fiber. To overcome this problem a number of measures are known to the person skilled in the art to improve and or increase the bonding of fibers to inorganic binder matrix materials such as concrete. In most cases the mechanical bonding between fiber and matrix is improved by increasing the surface area of fibers either by utilizing a large number of thin fibers with low denier compared to fibers with larger denier. Another way of increasing the surface is effected for example by fraying the ends of fibers as disclosed in US 2012146254. U.S. Pat. No. 5,731,080 discloses a plurality of fibers of expanded specific surface with a substantial quantity of microfibrils on the surface. Further precipitated calcium carbonate crystals are entangled by the microfibrils and mechanically joined to the fiber resulting in a composite product composed of fibro-crystalline heterogeneous structure. Basically the technique consists of preparing a suspension, generally an aqueous suspension of fiber into which a filler such as calcium carbonate is introduced. With removal of the aqueous medium the filler is mechanically retained in the microfibrilar net resulting in a product with a mineral load of greater than 20%. The mechanical bonding though has its limits and upon increased tensile stress fibers tend to be pulled out of the matrix, in particular in inorganic binder-based matrices used in the field of construction. With the here presented invention we provide modified fibers that have incorporated means of chemical bonding to matrices based in particular on inorganic binder systems via attachment of crystalline particles onto fibers that function as crystallization seeds.

"Crystallization seeds" are understood to be crystals of sizes in the range of 1 nm to 10 μm, preferably up to 5 μm, more preferred in the range of 5 nm to 1.5 μm and typically in the range of 10 nm to 300 nm and even more preferred in the range of 10 nm-100 nm. The seeds provide and function as a template and nucleation zone on which further molecules can assemble and grow into larger crystals.

Crystallization seed particles may be selected from, but are not limited to comprise calcium silicate hydrate, ettringite, gypsum, siliciumdioxide, calciumcarbonate, hydroxylapatite, magnesia, alumina, layered silicates and/or layered double hydroxides or mixtures thereof.

Typically calcium silicate hydrate or calcium sulfate dihydrate crystals are utilized. Calcium silicate hydrate particles are prepared by a reaction of a water-soluble calcium compound with a water soluble silicate compound in an aqueous solution in the presence of comb polymer (WO 2010/026155). Calcium silicate hydrate particles may also be prepared according to any other method known to the person skilled in the art, e.g. by hydrothermal reaction or mechanochemical reaction of CaO and $SiO_2$.

Calcium silicate hydrate which may contain foreign ion, such as magnesium and aluminum can be described with regard to its composition by the following empirical formula:

$$a CaO, SiO_2, b Al_2O_3, c H_2O, dX, eW$$

X is an alkali metal
W is an alkaline earth metal

| | | |
|---|---|---|
| $0.1 \leq a \leq 2$ | preferably | $0.66 \leq a \leq 1.8$ |
| $0 \leq b \leq 1$ | preferably | $0 \leq b \leq 0.1$ |
| $1 \leq c \leq 6$ | preferably | $1 \leq c \leq 6.0$ |
| $0 \leq d \leq 1$ | preferably | $0 \leq d \leq 0.4$ |
| $0 \leq e \leq 2$ | preferably | $0 \leq e \leq 0.1$ |

In a preferred embodiment, the aqueous solution also contains, in addition to silicate and calcium ions, further dissolved ions which are preferably provided in the form of dissolved aluminium salts and/or dissolved magnesium salts. As aluminium salts preferably aluminium halogens, aluminium nitrate, aluminium hydroxide and/or aluminium sulfate can be used. More preferable within the group of aluminium halogens is aluminium chloride. Magnesium salts can be preferably magnesium nitrate, magnesium chloride and/or magnesium sulfate.

Preferably the molar ratio of aluminium and/or magnesium to calcium and silicon is small. More preferably the molar ratios are selected in a way that in the previous empirical formula the preferable ranges for a, b and e are fulfilled (0.66≤a≤1.8; 0≤b 0.1; 0≤e0.1).

Calcium silicate hydrate seed particles may be obtained through one of the routes described herein.

In an embodiment of the invention, in a first step, the water-soluble calcium compound is mixed with the aqueous solution which contains a water-soluble comb polymer, so that a mixture preferably present as a solution is obtained, to which the water-soluble silicate compound is added in a subsequent second step. The water-soluble silicate compound of the second step can also contain water-soluble comb polymer. The comb polymers serve as stabilizers and further facilitate and support the binding, linking, or anchoring of crystallization seeds to the fibers and are obtainable according to procedures as described in the literature.

"Comb polymers" are copolymers based on unsaturated dicarboxylic acid derivatives and oxyalkylene glycol alkenyl ethers, as well as polycondensation products based on aromatic or heteroaromatic compounds obtained through methods as will be described in detail down below.

The aqueous solution may also contain one or more further solvents (for example alcohols like ethanol and/or isopropanol) in addition to water. Preferably the weight proportion of the solvent other than water to the sum of water and further solvent (e.g. alcohol) is up to 20 weight %, more preferably less than 10 weight % and the most preferably less than 5 weight %. However most preferable are aqueous systems without any solvent.

The temperature range in which the process is carried out is not especially limited. Certain limits however are imposed by the physical state of the system. It is preferable to work in the range of 0 to 100° C., more preferable 5 to 80° C. and most preferable 15 to 35° C. It is preferable not to exceed 80° C.

Also the process can be carried out at different pressures, preferably in a range of 1 to 5 bars.

The pH-value depends on the quantity of reactants (water-soluble calcium compound and water-soluble silicate) and on the solubility of the precipitated calcium silicate hydrate. It is preferable that the pH value is higher than 8 at the end of the synthesis, preferably in a range between 8 and 13.5.

In a further preferred embodiment, the aqueous solution containing comb polymer furthermore has the water-soluble calcium compound and the water-soluble silicate compound as components dissolved in it. This means that the reaction of the water-soluble calcium compound and the water-soluble silicate compound in order to precipitate calcium silicate hydrate occurs in the presence of an aqueous solution which contains water-soluble comb polymer.

A further preferred embodiment is characterized in that a solution of water-soluble calcium compound and a solution of a water-soluble silicate compound are added preferably separately to the aqueous solution containing water-soluble comb polymer.

To illustrate how this aspect of the invention can be carried out, for example three solutions can be prepared separately (solution (I) of a water-soluble calcium compound, solution (II) of a water-soluble silicate compound and a solution (III) of the comb polymer. Solutions (I) and (II) are preferably separately and simultaneously added to solution (III). Advantage of this preparation method is besides its good practicability that relatively small particle sizes can be obtained.

Fibers with crystallization seeds bound to or adhered to its surface are obtainable through treatment of fibers with seeding material obtained through a procedure as described above or by synthesis of calcium silicate hydrate seed particles in the presence of fibers.

In a preferred embodiment of the invention the solution of a water soluble calcium compound and the solution of a water-soluble silicate compound are added preferably separately and/or simultaneously to a suspension of fibers with the water-soluble comb polymer according to this invention.

In a further preferred embodiment of the invention the fibers are immersed in an aqueous solution containing water-soluble comb polymer, a water-soluble calcium compound and a water-soluble silicate compound obtained by one of the processes described above.

In general, the components are used in the following ratios:

i) 0.01 to 75, preferably 0.01 to 51, most preferably 0.01 to 15% by weight of water-soluble calcium compound,
ii) 0.01 to 75, preferably 0.01 to 55, most preferably 0.01 to 10% by weight of water-soluble silicate compound,
iii) 0.001 to 60, preferably 0.1 to 30, most preferable 0.1 to 10% by weight of water-soluble comb polymer,
iv) 24 to 99, preferably 50 to 99, most preferably 70 to 99% by weight of water.

Often, the water-soluble calcium compound is present as calcium chloride, calcium nitrate, calcium formate, calcium acetate, calcium bicarbonate, calcium bromide, calcium carbonate, calcium citrate, calcium chlorate, calcium fluoride, calcium gluconate, calcium hydroxide, calcium hypochloride, calcium iodate, calcium iodide, calcium lactate, calcium nitrite, calcium oxalate, calcium phosphate, calcium propionate, calcium silicate, calcium stearate, calcium sulfate, calcium sulfate hemihydrate, calcium sulfate dihydrate, calcium sulphide, calcium tartrate calcium aluminate, tricalcium silicate and/or dicalcium silicate. Preferably the water-soluble calcium compound is not a calcium silicate. The silicates calcium silicate, dicalcium silicate and/or tricalcium silicate are less preferred because of low solubility (especially in the case of calcium silicate) and for economic reasons (price) (especially in case of dicalcium silicate and tricalcium silicate).

The water-soluble calcium compound is preferably present as calcium acetate, calcium citrate, calcium tartrate, calcium formate and/or calcium sulfate. Advantage of these calcium compounds is their non-corrosiveness. Calcium citrate and/or calcium tartrate are preferably used in combination with other calcium sources because of the possible retarding effect of these anions when used in high concentrations.

In a further embodiment of the invention the calcium compound is present as calcium acetate, calcium chloride and/or calcium nitrate. Advantage of these calcium compounds is their good solubility in water, low price and good availability.

Most preferred calcium compound is calcium acetate.

Often, the water-soluble silicate compound is present as sodium silicate, potassium silicate, waterglass, aluminium silicate, tricalcium silicate, dicalcium silicate, calcium silicate, silicic acid, sodium metasilicate and/or potassium metasilicate.

The water-soluble silicate compound is preferably present as sodium metasilicate, potassium metasilicate and/or waterglass. Advantage of these silicate compounds is their extremely good solubility in water.

Most preferred silicate compound is sodium metasilicate pentahydrate.

Preferably species of different types are used as the water-soluble silicate compound and as the water-soluble calcium compound.

In a preferable process water-soluble alkali metal ions (for example lithium, sodium, potassium) are removed from the calcium silicate hydrate composition by cation exchangers and/or water-soluble nitrate and/or chloride ions are removed from the calcium silicate hydrate composition by anion exchangers. Preferably the removal of said cations and/or anions is carried out in a second process step after the preparation of the seed particle by the use of the ion exchangers. Acid ion exchangers suitable as cation exchanger are for example based on sodium polystyrene sulfonate or poly-2-acrylamido-2-methylpropane sulfonic acid (poly AMPS). Basic ion exchangers are for example based on amino groups, like for example poly (acrylamido-N-propyltrimethylammonium chloride) (polyAPTAC).

The comb polymer is water-soluble and present as a copolymer which contains, on the main chain, side chains having ether functions and acid functions.

Preferably the water-soluble comb polymer is present as a copolymer which is produced by free radical polymerization in the presence of acid monomer, preferably carboxylic acid monomer, and polyether macromonomer, so that altogether at least 45 mol %, preferably at least 80 mol %, of all structural units of the copolymer are produced by incorporation of acid monomer, preferably carboxylic acid monomer, and polyether macromonomer in the form of polymerized units. Acid monomer is to be understood as meaning monomers which are capable of free radical copolymerization, have at least one carbon double bond, contain at least one acid function, preferably a carboxylic acid function, and react as an acid in an aqueous medium. Furthermore, acid monomer is also to be understood as meaning monomers which are capable of free radical copolymerization, have at least one carbon double bond, form at least one acid function, preferably a carboxylic acid function, in an aqueous medium as a result of a hydrolysis reaction and react as an acid in an aqueous medium (example: maleic anhydride or hydrolysable esters of (meth) acrylic acid).

In the context of the present invention, polyether macromonomers are compounds which are capable of free radical copolymerization, have at least one carbon double bond, and have at least two ether oxygen atoms, with the proviso that the polyether macromonomer structural units present in the copolymer have side chains which contain at least two ether oxygen atoms, preferably at least 4 ether oxygen atoms, more preferably at least 8 ether oxygen atoms, most preferably at least 15 ether oxygen atoms.

Structural units, which do not constitute an acid monomer or a polyether macromonomer can be for example styrene and derivatives of styrene (for example methyl substituted derivatives), vinyl acetate, vinyl pyrrolidone, butadiene, vinyl propionate, unsaturated hydrocarbons like for example ethylene, propylene and/or (iso)butylene. This listing is a non-exhaustive enumeration. Preferable are monomers with not more than one carbon double bond.

In a preferred embodiment of the invention the water-soluble comb-polymer is a copolymer of styrene and a half ester of maleic acid with a monofunctional polyalkylene glycol. Preferably such a copolymer can be produced by free radical polymerization of the monomers styrene and maleic anhydride (or maleic acid) in a first step. In the second step polyalkylene glycols, preferably alkyl polyalkylene glycols (preferably alkyl polyethylene glycols, most preferably methyl polyethyleneglycol) are reacted with the copolymer of styrene and maleic anhydride in order to achieve an esterification of the acid groups. Styrene can be completely or partially replaced by styrene derivatives, for example methyl substituted derivatives. Copolymers of this preferred embodiment are described in U.S. Pat. No. 5,158,996, the disclosure of which is incorporated into the present patent application.

Frequently, a structural unit is produced in the copolymer by incorporation of the acid monomer in the form polymerized units, which structural unit is in accordance with the general formulae (Ia), (Ib), (Ic) and/or (Id)

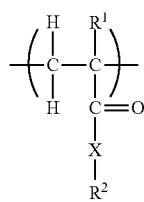
(Ia)

where $R^1$ are identical or different and are represented by H and/or a non-branched chain or a branched $C_1$-$C_4$ alkyl group;

X are identical or different and are represented by NH—$(C_nH_{2n})$ where n=1, 2, 3 or 4 and/or O—$(C_nH_{2n})$ where n=1, 2, 3 or 4 and/or by a unit not present;

$R^2$ are identical or different and are represented by OH, $SO_3H$, $PO_3H_2$, O—$PO_3H_2$ and/or para-substituted $C_6H_4$—$SO_3H$, with the proviso that, if X is a unit not present, $R^2$ is represented by OH;

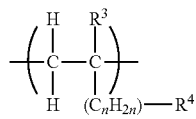
(Ib)

where $R^3$ are identical or different and are represented by H and/or a non-branched chain or a branched $C_1$-$C_4$ alkyl group;

n=0, 1, 2, 3 or 4

$R^4$ are identical or different and are represented by $SO_3H$, $PO_3H_2$, O—$PO_3H_2$ and/or para-substituted $C_6H_4$—$SO_3H$;

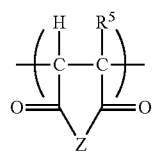
(Ic)

where $R^5$ are identical or different and are represented by H and/or a non-branched chain or a branched $C_1$-$C_4$ alkyl group;

Z are identical or different and are represented by O and/or NH;

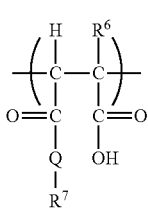
(Id)

where $R^6$ are identical or different and are represented by H and/or a non-branched chain or a branched $C_1$-$C_4$ alkyl group;

Q are identical or different and are represented by NH and/or O;

$R^7$ are identical or different and are represented by H, $(C_n$—$H_{2n})$—$SO_3H$ where n=0, 1, 2, 3 or 4, preferably 1, 2, 3 or 4, $(C_nH_{2n})$—OH where n=0, 1, 2, 3 or 4, preferably 1, 2, 3 or 4; $(C_nH_{2n})$—$PO_3H_2$ where n=0, 1, 2, 3 or 4, preferably 1, 2, 3 or 4, $(C_n$—$H_{2n})$—$OPO_3H_2$ where n=0, 1, 2, 3 or 4, preferably 1, 2, 3 or 4, $(C_6H_4)$—$SO_3H$, $(C_6H_4)$—$PO_3H_2$, $(C_6H_4)$—$OPO_3H_2$ and/or $(C_mH_{2n})_e$—O-(A'O)$_\alpha$—$R^9$ where m=0, 1, 2, 3 or 4, preferably 1, 2, 3 or 4, e=0, 1, 2, 3 or 4, preferably 1, 2, 3 or 4, A'=$C_{x'}$—$H_{2x'}$ where x'=2, 3, 4 or 5 and/or $CH_2C(C_6H_5)H$—, $\alpha$=an integer from 1 to 350 where $R^9$ are identical or different and are represented by a non-branched chain or a branched $C_1$-$C_4$ alkyl group.

Typically, a structural unit is produced in the copolymer by incorporation of the polyether macromonomer in the form of polymerized units, which structural unit is in accordance with the general formulae (IIa), (IIb) and/or (IIc)

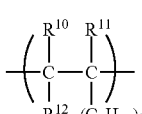
(IIa)

where $R^{10}$, $R^{11}$ and $R^{12}$ are in each case identical or different and, independently of one another, are represented by H and/or a non-branched chain or a branched $C_1$-$C_4$ alkyl group;

E are identical or different and are represented by a non-branched chain or branched $C_1$-$C_6$ alkylene group, preferably $C_2$-$C_6$ alkylene group, a cyclohexylen group, $CH_2$—$C_6H_{10}$, ortho-, meta- or para-substituted $C_6H_4$ and/or a unit not present;

G are identical or different and are represented by O, NH and/or CO—NH, with the proviso that, if E is a unit not present, G is also present as a unit not present;

A are identical or different and are represented by $C_xH_2$, where x=2, 3, 4 and/or 5 (preferably x=2) and/or $CH_2CH(C_6H_5)$;

n are identical or different and are represented by 0, 1, 2, 3, 4 and/or 5;

a are identical or different and are represented by an integer from 2 to 350 (preferably 10-200);

$R^{13}$ are identical or different and are represented by H, a non-branched chain or a branched $C_1$-$C_4$ alkyl group, CO—$NH_2$, and/or $COCH_3$;

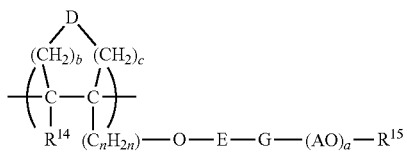

(IIb)

where
$R^{14}$ are identical or different and are represented by H and/or a non-branched chain or branched $C_1$-$C_4$ alkyl group;
E are identical or different and are represented by a non-branched chain or branched $C_1$-$C_6$ alkylene group, preferably a $C_2$-$C_6$ alkylene group, a cyclohexylen group, $CH_2$—$C_6H_{10}$, ortho-, meta- or para-substituted $C_6H_4$ and/or by a unit not present;
G are identical or different and are represented by a unit not present, O, NH and/or CO—NH, with the proviso that, if E is a unit not present, G is also present as a unit not present;
A are identical or different and are represented by $C_xH_{2x}$ where x=2, 3, 4 and/or 5 and/or $CH_2CH(C_6H_5)$;
n are identical or different and are represented by 0, 1, 2, 3, 4 and/or 5
a are identical or different and are represented by an integer from 2 to 350;
D are identical or different and are represented by a unit not present, NH and/or O, with the proviso that if D is a unit not present: b=0, 1, 2, 3 or 4 and c=0, 1, 2, 3 or 4, where b+c=3 or 4, and
with the proviso that if D is NH and/or O, b=0, 1, 2 or 3, c=0, 1, 2 or 3, where b+c=2 or 3;
$R^{15}$ are identical or different and are represented by H, a non-branched chain or branched $C_1$-$C_4$ alkyl group, CO—$NH_2$, and/or $COCH_3$;

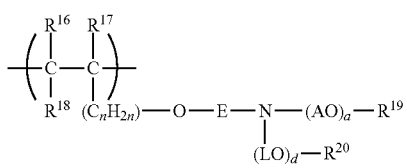

(IIc)

where
$R^{16}$, $R^{17}$ and $R^{18}$ are in each case identical or different and, independently of one another, are represented by H and/or a non-branched chain or branched $C_1$-$C_4$ alkyl group;
E are identical or different and are represented by a non-branched chain or a branched $C_1$-$C_6$ alkylene group, preferably a $C_2$-$C_6$ alkylene group, a cyclohexylen group, $CH_2$—$C_6H_{10}$, ortho-, meta- or para-substituted $C_6H_4$ and/or by a unit not present; preferably E is not a unit not present;
A are identical or different and are represented by $C_xH_{2x}$ where x=2, 3, 4 and/or 5 and/or $CH_2CH(C_6H_5)$;
n are identical or different and are represented by 0, 1, 2, 3, 4 and/or 5;
L are identical or different and are represented by $C_xH_{2x}$ where x=2, 3, 4 and/or 5 and/or $CH_2$—$CH(C_6H_5)$;
a are identical or different and are represented by an integer from 2 to 350;
d are identical or different and are represented by an integer from 1 to 350;
$R^{19}$ are identical or different and are represented by H and/or a non-branched chain or a branched $C_1$-$C_4$ alkyl group,
$R^{20}$ are identical or different and are represented by H and/or a non-branched chain $C_1$-$C_4$ alkyl group.

In a further embodiment of the invention a structural unit is produced in the copolymer by incorporation of the polyether macromonomer in the form of polymerized units, which structural unit is in accordance with the general formula (IId)

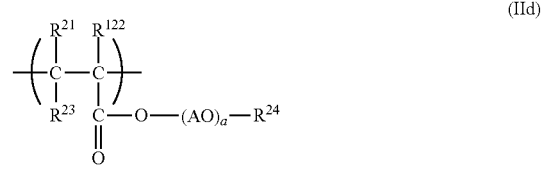

(IId)

where
$R^{21}$, $R^{22}$ and $R^{23}$ are in each case identical or different and, independently of one another, are represented by H and/or a non-branched chain or branched $C_1$-$C_4$ alkyl group;
A are identical or different and are represented by $C_xH_2$, where x=2, 3, 4 and/or 5 and/or $CH_2CH(C_6H_5)$;
a are identical or different and are represented by an integer from 2 to 350;
$R^{24}$ are identical or different and are represented by H and/or a non-branched chain or a branched $C_1$-$C_4$ alkyl group, preferably a $C_1$-$C_4$ alkyl group.

Alkoxylated isoprenol and/or alkoxylated hydroxybutyl vinyl ether and/or alkoxylated (meth)allyl alcohol and/or vinylated methylpolyalkylene glycol having preferably in each case an arithmetic mean number of 4 to 340 oxyalkylene groups is preferably used as the polyether macromonomer. Methacrylic acid, acrylic acid, maleic acid, maleic anhydride, a monoester of maleic acid or a mixture of a plurality of these components is preferably used as the acid monomer.

In a preferred embodiment of the invention the process is characterized in that polycondensates containing
(I) at least one structural unit consisting of an aromatic or heteroaromatic moiety bearing a polyether side chain, preferably a poly alkylene glycol side chain, more preferably a poly ethylene glycol side chain and
(II) at least one structural unit consisting of an aromatic or heteroaromatic moiety bearing at least one phosphoric acid ester group and/or its salt are present in the aqueous solution which contains a water-soluble comb polymer.

Preferably the aqueous solution in which the reaction is carried out contains besides the comb polymer a second polymer. The second polymer is a polycondensate as described. Preferably the comb polymer used together with the polycondensate is obtainable by a radical polymerization.

The polycondensates according to this embodiment are known in the prior art (US 20080108732 A1). US 20080108732 A1 describes polycondensates based on an aromatic or heteroaromatic compound (A) having 5 to 10 C atoms or heteroatoms, having at least one oxyethylene or oxypropylene radical, and an aldehyde (C) selected from the group consisting of formaldehyde, glyoxylic acid and benzaldehyde or mixtures thereof. In a particular embodiment, these may also be phosphated polycondensates.

Typically the polycondensate contains (I) at least one structural unit consisting of an aromatic or heteroaromatic moiety bearing a polyether side chain, preferably a polyalkylene glycol side chain, more preferably a polyethylene glycol side chain. The structural unit consisting of an aromatic or heteroaromatic moiety bearing a polyether side chain, preferably a polyethylene glycol side chain is selected preferably from the group of alkoxylated, preferably ethoxylated, hydroxy-functionalized aromates or heteroaromates (for example the aromates can be selected from phenoxyethanol, phenoxypropanol, 2-al koxyphenoxyethanols, 4-alkoxyphenoxyethanols, 2-alkylphenoxyethanols, 4-alkylphenoxyethanols) and/or alkoxylated, preferably ethoxylated, amino-functionalized aromates or heteroaromates (for example the aromates can be selected from N,N-(Dihydroxyethyl)aniline, N,-(Hydroxyethyl)aniline, N,N-(Dihydroxypropyl)aniline, N,-(Hydroxypropyl)aniline). More preferable are alkoxylated phenol derivatives (for example phenoxyethanol or phenoxypropanol), most preferable are alkoxylated, especially ethoxylated phenol derivatives featuring weight average molecular weights between 300 g/mol and 10,000 g/mol (for example polyethylenglycol monophenylethers).

Typically the polycondensate contains (II) at least one phosphated structural unit consisting of an aromatic or heteroaromatic moiety bearing at least one phosphoric acid ester group and/or a salt of the phosphoric acid ester group, which is selected preferably from the group of alkoxylated hydroxy-functionalized aromates or heteroaromates (for example phenoxyethanol phosphate, polyethylenglycol monophenylether phosphates) and/or alkoxylated amino-functionalized aromates or heteroaromates (for example N,N-(Dihydroxyethyl)aniline diphosphate, N,N-(Dihydroxyethyl)aniline phosphate, N,-(Hydroxypropyl)aniline phosphate), which bear at least one phosphoric acid ester group and/or a salt of the phosphoric acid ester group (e.g. by esterification with phosphoric acid and optional addition of bases). More preferable are alkoxylated phenols bearing at least one phosphoric acid ester group and/or a salt of the phosphoric acid ester group (for example polyethylenglycol monophenylether phosphates with less than 25 ethylene glycol units) and most preferable are the respective alkoxylated phenols featuring weight average molecular weights between 200 g/mol and 600 g/mol (for example phenoxyethanol phosphate, polyethylenglycol monophenylether phosphates with 2 to 10 ethyleneglycol units), the alkoxylated phenols bearing at least one phosphoric acid ester group and/or a salt of the phosphoric acid ester group (e.g. by esterification with phosphoric acid and optional addition of bases).

In another embodiment of the invention the process is characterized in that in the polycondensate the structural units (I) and (II) are represented by the following general formulae

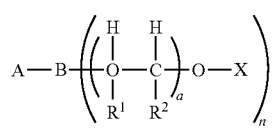

where
A are identical or different and are represented by a substituted or unsubstituted aromatic or heteroaromatic compound having 5 to 10 C atoms
where
B are identical or different and are represented by N, NH or O
where
n is 2 if B is N and n is 1 if B is NH or O
where
$R^1$ and $R^2$, independently of one another, are identical or different and are represented by a branched or straight-chain $C_1$- to $C_{10}$-alkyl radical, $C_5$- to $C_8$-cycloalkyl radical, aryl radical, heteroaryl radical or H
where
a are identical or different and are represented by an integer from 1 to 300
where
X are identical or different and are represented by a branched or straight-chain $C_1$- to $C_{10}$-alkyl radical, $C_5$- to $C_8$-cycloalkyl radical, aryl radical, heteroaryl radical or H, preferably H,

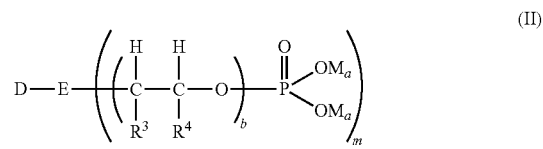

where
D are identical or different and are represented by a substituted or unsubstituted heteroaromatic compound having 5 to 10 C atoms
where
E are identical or different and are represented by N, NH or O
where
m is 2 if E is N and m is 1 if E is NH or O
where
$R^3$ and $R^4$, independently of one another, are identical or different and are represented by a branched or straight-chain $C_1$- to $C_{10}$-alkyl radical, $C_5$- to $C_8$-cycloalkyl radical, aryl radical, heteroaryl radical or H
where
b are identical or different and are represented by an integer from 1 to 300
where
M is independently of one another an alkaline metal ion, alkaline earth metal ion, ammonium ion, organic ammonium ion and/or H, a is 1 or in the case of alkaline earth metal ions ½.

The groups A and D in the general formulae (I) and (II) of the polycondensate are preferably represented by phenyl, 2-hydroxyphenyl, 3-hydroxyphenyl, 4-hydroxyphenyl, 2-methoxyphenyl, 3-methoxyphenyl, 4-methoxyphenyl, naphthyl, 2-hydroxynaphthyl, 4-hydroxynaphthyl, 2-methoxynaphthyl, 4-methoxynaphthyl, preferably phenyl, it being possible for A and D to be chosen independently of one another and also in each case to consist of a mixture of said compounds. The groups B and E, independently of one another, are preferably represented by O. The radicals $R^1$, $R^2$, $R^3$ and $R^4$ can be chosen independently of one another and are preferably represented by H, methyl, ethyl or phenyl, particularly preferably by H or methyl and especially preferably by H.

In general formula (I) a is preferably represented by an integer from 1 to 300, in particular 3 to 200 and particularly preferably 5 to 150 and b in general formula (II) by an integer from 1 to 300, preferably 1 to 50 and particularly preferably 1 to 10. The respective radicals, the length of which is defined by a and b, respectively, may consist here of uniform building blocks, but a mixture of different building blocks may also be expedient. Furthermore, the radicals of the general formulae (I) or (II), independently of one another, may each have the same chain length, a and b each being represented by a number. As a rule, however, it will be expedient if mixtures having different chain lengths are present in each case so that the radicals of the structural units in the polycondensate have different numerical values for a and independently for b.

Frequently, the phosphated polycondensate according to the invention has a weight average molecular weight of 5.000 g/mol to 200.000 g/mol, preferably 10.000 to 100.000 g/mol and particularly preferably 15.000 to 55.000 g/mol.

The phosphated polycondensate can be present also in form of its salts, as for example the sodium, potassium, organic ammonium, ammonium and/or calcium salt, preferably as the sodium and/or calcium salt.

Typically the molar ratio of the structural units (I):(II) is 1:10 to 10:1, preferably 1:8 to 1:1. It is advantageous to have a relatively high proportion of structural units (II) in the polycondensate because a relatively high negative charge of the polymers has a good influence on the stability of the suspensions.

In a preferred embodiment of the invention the polycondensate contains a further structural unit (III) which is represented by the following formula

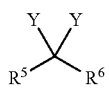

(III)

where
Y, independently of one another, are identical or different and are represented by (I), (II), or further constituents of the polycondensate
where
$R^5$ are identical or different and are represented by H, $CH_3$, COOH or a substituted or unsubstituted aromatic or heteroaromatic compound having 5 to 10 C atoms, preferably H where
$R^6$ are identical or different and are represented by H, $CH_3$, COOH or a substituted or unsubstituted aromatic or heteroaromatic compound having 5 to 10 C atoms, preferably H.

The polycondensates are typically prepared by a process in which (I) at least one structural unit consisting of an aromatic or heteroaromatic moiety bearing a polyether side chain (for example poly(ethyleneglycol)monophenyl ether) and (II) at least one structural unit consisting of an aromatic or heteroaromatic moiety bearing at least one phosphoric acid ester group and/or a salt of the phosphoric acid ester group (for example phenoxyethanol phosphoric acid ester) are reacted with (IIIa) a monomer having a keto group. Preferably the monomer having a keto group is represented by the general formula (IIIa),

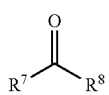

(IIIa)

where
$R^7$ are identical or different and are represented by H, $CH_3$, COOH and/or a substituted or unsubstituted aromatic or heteroaromatic compound having 5 to 10 C atoms, preferably H, where
$R^8$ are identical or different and are represented by H, $CH_3$, COOH and/or a substituted or unsubstituted aromatic or heteroaromatic compound having 5 to 10 C atoms, preferably H.

Preferably the monomer having a keto group is selected from the group of ketones, preferably being an aldehyde, most preferably formaldehyde. Examples for chemicals according to general structure (IIIa) are formaldehyde, acetaldehyde, acetone, glyoxylic acid and/or benzaldehyde. Formaldehyde is preferable.

Typically $R^5$ and $R^6$ in structural unit (III), independently of one another, are identical or different and are represented by H, COOH and/or methyl. Most preferably H.

In another preferred embodiment of the invention the molar ratio of the structural units [(I)+(II)]:(III) is 1:0.8 to 3 in the polycondensate.

Preferably the polycondensation is carried out in the presence of an acidic catalyst, this catalyst preferably being sulphuric acid, methanesulphonic acid, para-toluenesulphonic acid or mixtures thereof. The polycondensation and the phosphation are advantageously carried out at a temperature between 20 and 150° C. and a pressure between 1 and 10 bar. In particular, a temperature range between 80 and 130° C. has proved to be expedient. The duration of the reaction may be between 0.1 and 24 hours, depending on temperature, the chemical nature of the monomers used and the desired degree of crosslinking.

Crosslinking can preferably occur if monosubstituted monomers of structural unit I and/or II are used because the condensation reaction can occur in the two ortho positions and the para position. Once the desired degree of polycondensation has been reached, which can also be determined, for example, by measurement of the viscosity of the reaction mixture, the reaction mixture is cooled.

The reaction mixture might be subjected to a thermal after treatment at a pH between 8 and 13 and a temperature between 60 and 130° C. after the end of the condensation and phosphation reaction. As a result of the thermal after treatment, which advantageously lasts for between 5 minutes and 5 hours, it is possible substantially to reduce the aldehyde content, in particular the formaldehyde content, in the reaction solution. Alternatively the reaction mixture can be subjected to a vacuum treatment or other methods known in the prior art to reduce the content of (form)aldehyde.

In order to obtain a better shelf life and better product properties, it is advantageous to treat the reaction solutions with basic compounds. It is therefore to be regarded as being preferred to react the reaction mixture after the end of the reaction with a basic sodium, potassium, ammonium or calcium compound. Sodium hydroxide, potassium hydroxide, ammonium hydroxide or calcium hydroxide has proved to be particularly expedient here, it being regarded as being preferred to neutralize the reaction mixture. However, other alkali metal and alkaline earth metal salts and salts of organic amine are suitable as salts of the phosphated polycondensates as well.

Mixed salts of the phosphated polycondensates can also be prepared by reaction of the polycondensates with at least two basic compounds.

The catalyst used can also be separated off. This can conveniently be done via the salt formed during the neutralization. If sulphuric acid is used as a catalyst and the reaction solution is treated with calcium hydroxide, the calcium sulfate formed can be separated off, for example, in a simple manner by filtration.

Furthermore, by adjusting the pH of the reaction solution to 1.0 to 4.0, in particular 1.5 to 2.0, the phosphated polycondensate can be separated from the aqueous salt solution by phase separation and can be isolated. The phosphated polycondensate can then be taken up in the desired amount of water. However, other methods known to the person skilled in the art, such as dialysis, ultrafiltration or the use of an ion exchanger, are also suitable for separating off the catalyst.

The problem to be solved by the present invention is to provide means to increase the pull-out strength of fibers used in building and construction materials based on non-hydraulic, latent hydraulic and hydraulic binders and so create building materials with enhanced strength and flexibility with sustained mechanical stability.

A solution to this problem is provided by novel fibers that have attached to their surface crystallization seeds. Fiber-surface modification to increase the bonding to the inorganic binder matrix is achieved by the inventive process, thereby introducing means of direct interaction of fibers with inorganic binder matrix resulting in increased pull-out strength. The individual fiber body surface is modified by creating or generating one or more functional groups or linker moieties on the fiber surface. Such fibers may be obtained either by treatment with reagents capable of generating or creating such functional groups or linkers moieties or physically introducing such functional groups or linkers moieties, such as silanol, into the fiber matrix, wherein such functional group or linker moiety protrudes from the fiber surface. The attachment of the crystallization seeds to the fiber via said linker moieties may further be performed in the presence of and stabilized by comb polymers. The comb polymers function as a stabilizer may be effected by either covalent or non-covalent interaction or bonding, forming a seed-linker-comb polymer complex.

The invention is particularly useful when the crystallization seeds are calcium derived, for example, but not limited to, calcium silicate hydrate (CSH)—or calcium sulfate seeds.

Such modified fibers lead to a chemical bond between fiber and inorganic binder matrix with respective increase in strengthening and toughening of the hardened inorganic binder material but simultaneously retaining and improving the ductility and flexibility of such hardened material.

This is achieved for example by utilization of CSH-seeds attached to the fiber surface. The CSH-seeds function as crystallization points for growth of new CSH crystals in the hardening hydraulic matrix and thus turning into an integral moiety of the three dimensional and complex arrangements of newly formed crystals in the hardening inorganic binder matrix, for example in a hydraulic cementitious matrix.

This is further achieved for example by utilization of calcium sulfate dihydrate-seeds attached to the fiber surface. The calcium sulfate dihydrate-seeds function also as crystallization points for growth of new calcium sulfate dihydrate crystals in a hardening gypsum slurry matrix and thus turning into an integral moiety of the three dimensional and complex arrangements of the newly hardened non-hydraulic gypsum or stucco matrix.

Fibers selected from at least one of cellulose-based fiber like cotton, viscose, hemp, jute, sisal, abaca, bamboo, cellulose, regenerated cellulose (e.g. Lycocell®), mineral-based fiber like carbon, glass, mineral wool, basalt, oxide ceramic, metal-based fiber like steel, or synthetic polymer-based fiber selected from the group consisting of polyamide, polyester, polyvinylalcohol, aramide or polyolefins like polyethylene, polypropylene, polyoxymethylene, poly(vinylidene fluoride), poly(methylpentene), poly(ethylenechlorotrifluoroethylene), poly(vinylfluoride), poly(ethyleneoxide), poly(ethyleneterephthalate) and polybutene or any mixtures thereof are subjected to surface treatment prior to being exposed to seed particles. Fibers are usually 2 µm to 2 mm, preferably 10 µm to 100 µm in diameter and 0.5 mm to 26 cm in length.

Preferably the fibers are discontinuous, but may also be continuous, endless fibers, where discontinuous and continuous fibers may further be utilized to prepare non-woven and woven structures and meshes.

Preferred fibers are selected from plastic fibers with high modulus/high tensile strength such as polypropylene and polyvinyl alcohol.

Most preferred are fibers from nonpolar plastic material such as polypropylene.

Further, the inventive fibers are basically free of any inorganic binder. Additionally the ratio of fiber to seed by weight is more than 0 and up to 2.5, preferably up to 50, more preferred up to 500 and most preferred up to 1000. Typically the ratio of fiber to seed is from 25 to 300.

Reagents for the surface treatment of fibers are selected from any type creating one or more functional groups as "linker moieties" on the fiber surface, e.g. amine, amide, phosphate or phosphonate functionality, preferably any type of amphiphilic molecule containing amine, ammonium, amide, nitrate, sulfate, sulfonate, sulfonamide, carboxylate, silanol, phosphate, phosphinate or phosphonate groups.

Any type of small molecule or polymer reagent creating amine, ammonium amide, nitrate, sulfate, sulfonate, sulfonamide, carboxylate, silanol, phosphate, phosphinate or phosphonate functionalities at or on the fiber surface may also be utilized. Also any type of other molecule containing groups or functionalities which can bind to fiber surface and carry amine, ammonium, amide, nitrate, sulfate, sulfonate, sulfonamide, carboxylate, silanol, phosphate, phosphinate or phosphonate groups.

Typically such reagents are selected from 3-aminopropyltriethoxysilane, triethylphosphitdiethyl triamine, polyvinylamine-polypropylene copolymer, ammonium polyphosphate, 1,4-butanosultone, chloroacetate, sulforylchloride, aminoacetaldehyde dimethylacetate, methanesulfonic acid, phosphorous oxychloride or the like.

A further aspect of the invention concerns a plurality of individual fiber-bodies having attached to the surface of such individual fiber-bodies crystallization seeds. Such plurality of individual fibers are also understood in the context of the present application as fibers or modified fibers.

The invention further concerns a method for the preparation of a plurality of individual fiber-bodies having attached to the surface of such individual fiber-bodies crystallization seeds, wherein the individual fiber body surface is modified such that crystallization seeds readily link, attach to or bind to said individual fiber-bodies.

Further the invention relates to the use of a plurality of individual fiber-bodies having attached to the surface of such individual fiber-bodies crystallization seeds to tune and modify the mechanical properties of an inorganic binder composition.

A further aspect of the invention concerns a method for the enhancement of bonding between fibers and inorganic binder matrix characterized by use of plurality of individual fiber-bodies having attached to the surface of such individual fiber-bodies crystallization seeds.

The inorganic binder compositions, preferably gypsum or cementious based suspensions can also contain any formulation component typically used in the field of construction materials, defoamers, air entrainers, set retarders, shrinkage reducers, redispersible powders, hardening accelerators, anti-freezing agents, plasticizers, water reducers, corrosion inhibitors and/or anti-efflorescence agents or mixtures thereof.

The invention comprises the use of modified fibers obtainable according to any of the processes of the present invention or of a composition according to this invention, in building material mixtures containing modified fibers, cement, gypsum, anhydrite, slag, preferably ground granulated blast furnace slag, fly ash, silica dust, metakaolin, natural pozzolans, calcined oil shale, calcium sulphoaluminate cement and/or calcium aluminate cement, preferably in building material mixtures that may comprise non-hydraulic binders, latent hydraulic binders or contain substantially a hydraulic binder such as cement. Hydraulic or latent hydraulic binder containing building materials are also encompassed by the term "cementitious material".

Gypsum comprises in this context all possible calcium sulfate carriers with different amounts of crystal water molecules, like for example also calcium sulfate hemihydrate, dihydrate, monohydrate or anhydrite including any hydrous or anhydrous phases and polymorphs thereof.

The invention comprises the use of a modified fiber comprising inorganic binder composition according to this invention for structures comprised of hardened building material mixtures, the building material mixtures containing modified fibers, cement, gypsum, anhydrite, slag, preferably ground granulated blast furnace slag, fly ash, silica dust, metakaolin, natural pozzolans, calcined oil shale, calcium sulpho aluminate cement and/or calcium aluminate cement, preferably the building material mixtures that may comprise latent hydraulic, non-hydraulic binders or contain substantially cement as a hydraulic binder.

The invention also concerns building material mixtures, which contain a inorganic binder composition, preferably modified fiber composition according to this invention and gypsum, anhydrite, cement, slag, preferably ground granulated blast furnace slag, fly ash, silica dust, metakaolin, natural pozzolans, calcined oil shale, calcium sulpho aluminate cement and/or calcium aluminate cement. Preferably the building material mixtures may comprise latent hydraulic, non-hydraulic binders or contain substantially cement as a hydraulic binder. The modified fiber composition is contained in the building material mixture preferably at a dosage of 0, 05 to 10 weight %, preferably 0.1 to 5 weight % with respect to the binder weight.

For illustration the term "building material mixtures" can mean mixtures of hydraulic, latent hydraulic or non-hydraulic binder in dry or aqueous form and in the hardened or plastic state. Dry building material mixtures could be for example mixtures of said binders, preferably calcium sulfate or cement and the modified fibers (preferably in dry form) according to this invention. Mixtures in aqueous form, usually in the form of hydrate phases, slurries, pastes, fresh mortar or fresh concrete are produced by the addition of water to the binder component(s) and the modified fibers, they then transform from the plastic to the hardened state.

Further, the invention relates to an inorganic binder composition, comprising a matrix material selected from the group consisting of inorganic binder systems, composite materials, latent hydraulic, hydraulic and non-hydraulic binders, and a plurality of individual fiber-bodies having attached to the surface of such individual fiber-bodies crystallization seeds.

The invention also relates to an inorganic binder composition comprising a matrix material selected from the group consisting of inorganic binder systems, composite materials, latent hydraulic, hydraulic and non-hydraulic binders, and a plurality of individual fiber-bodies having attached to the surface of such individual fiber-bodies crystallization seeds, wherein, in said plurality of individual fiber-bodies, said individual fiber-bodies are separated from each other.

Further the invention concerns the inorganic binder composition comprising a matrix material selected from the group consisting of inorganic binder systems, composite materials latent hydraulic, hydraulic and non-hydraulic binders, and a plurality of individual fiber-bodies having attached to the surface of such individual fiber-bodies crystallization seeds, wherein, in said plurality of individual fiber-bodies, fiber-bodies are selected from at least one of cellulose-based fibers, like cotton, viscose, hemp, jute, sisal, abaca, bamboo, cellulose, regenerated cellulose (e.g. Lycocell®), mineral-based fibers, like carbon, glass, mineral wool, basalt, oxide ceramic, metal-based fibers, like steel, synthetic polymer-based fibers, polyamide, polyester, polyvinylalcohol, aramide or selected from the group of polyolefines consisting of polyethylene, polypropylene, polyoxymethylene, poly(vinylidene fluoride), poly (methylpentene), poly(ethylene-chlorotrifluoroethylene), poly(vinylfluoride), poly(ethyleneoxide), poly(ethyleneterephthalate), poly(butylenterephthalate) and polybutene or any mixtures thereof.

Preferably the invention relates to an inorganic binder composition comprising a matrix material selected from the group consisting of inorganic binder systems, composite materials, latent hydraulic, hydraulic and non-hydraulic binders, and a plurality of individual fiber-bodies having attached to the surface of such individual fiber-bodies crystallization seeds, wherein, in said plurality of individual fiber-bodies, said at least one polymer is selected from polypropylene, polyvinyl alcohol or cellulose.

Furthermore the invention relates to an inorganic binder composition comprising a matrix material selected from the group consisting of inorganic binder systems, composite materials, latent hydraulic, hydraulic and non-hydraulic binders, and a plurality of individual fiber-bodies having attached to the surface of such individual fiber-bodies crystallization seeds, wherein said inorganic binder composition is gypsum based or based on a cementitious material.

The invention also concerns an inorganic binder composition as described above further comprising foam, foaming agents, defoamers, air entrainers, set retarders, shrinkage reducers, dispersible powders, hardening accelerators, anti-freezing agents, plasticizers, water reducers, corrosion inhibitors and/or anti-efflorescence agents or mixtures thereof.

An advantage of the invention is a structure reinforced with a plurality of individual fiber-bodies as described above, the fibers being capable of endowing enhanced mechanical stability combined with improved and enhanced flexibility and ductility. The inventive fibers may not only be utilized to improve or enhance flexibility and ductility of dense structures obtained after setting of cementitious binder or calcium sulfate based binder slurries, but also confers improved mechanical properties to porous structures or grains such as in foamed gypsum boards. Such inventive fiber containing compositions or structures are also understood to be "fiber-reinforced" compositions, materials or structures.

Another advantage of the invention is in that the structure may further be made of a material selected from a non-hydraulic plaster material such as gypsum or hydraulic cementitious material, such as a mortar or concrete.

The invention also concerns a structure made of concrete. Structures made from concrete are comprised of concrete having therein modified fibers. The concrete is any suitable concrete known in the art. Further the modified fibers are solid at ambient temperature and are added as a solid and stay solid in the concrete mixture. The resulting concrete structures present a high degree of ductility and flexibility and make it particularly useful to manufacture reinforced concrete where high deformation requirements are demanded.

The invention further relates to gypsum wallboards or polyamide-based structures comprising plurality of individual fiber-bodies as described above.

Further, the inventive structures are crack-resistant, high tensile strength shaped articles comprising concrete composite reinforced with inventive fibers.

Figure 1:
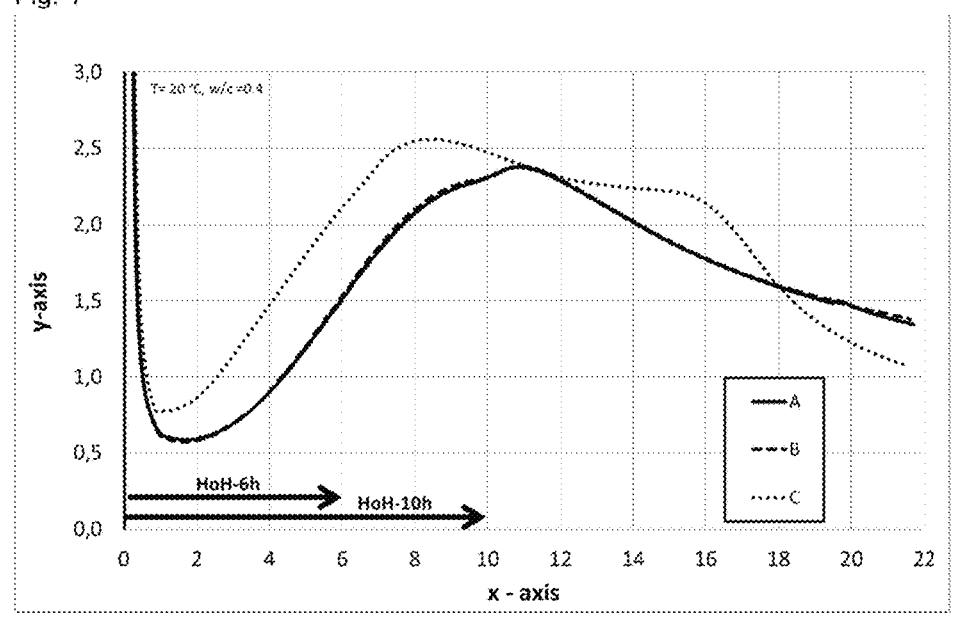
FIG. 1: Heat flow curve for control fiber F1 and modified fiber F1-Seed1. Cumulated heat of hydration (HoH) is a measure of the activity of the seeds on the fiber (A=PVA Fiber; B=PVA Fiber modified by 3-(Aminopropyl)triethoxysilane; C=CSH-Seeds on PVA Fiber modified by 3-(Aminopropyl)triethoxysilane; y-axis=Normalized Heat Flow [mW/g (cement)]; x-axis=Time [h])

Table 2: Summary of application tests. The $F_{Max,2}$ increased after CSH modification. Also a significant improvement in the crack opening at this load can be recognized. (A: PP fiber reference (coextruded with fumed silica); B: PP fiber (coextruded with fumed silica) and addition of an extra amount of CSH powder in the mortar (1 wt % with respect to the fiber content); C: PP fiber (coextruded with fumed silica) and addition of an extra amount of CSH powder in the mortar (2 wt % with respect to the fiber content); D: CSH modified PP fiber (coextruded with fumed silica)

TABLE 1

| Example | Fiber | Route for Seeding | unmodified fiber | | modified fiber with different linker moieties | | modified fiber with stabilizer | |
| --- | --- | --- | --- | --- | --- | --- | --- | --- |
| | | | HoH-6h (J/g) | HoH-10H (J/g) | HoH-6h (J/g) | HoH-10H (J/g) | HoH-6h (J/g) | HoH-10H (J/g) |
| F1 | PVA | Route 1 | 17.2 | 46.2 | 17.2 | 46.5 | 25.8 | 61.0 |
| F2 | PP | Route 1 | 19.5 | 51.1 | 18.3 | 48.9 | 21.3 | 53.8 |
| F3 | PP | Route 1 | 19.5 | 51.1 | 17.4 | 47.0 | 21.5 | 54.0 |
| F4 | PP | Route 1 | 16.3 | 44.1 | 16.0 | 44.1 | 20.6 | 52.1 |
| F5 | Basalt | Route 1 | 15.2 | 42.1 | 13.7 | 38.4 | 15.5 | 52.4 |
| F6 | cellulose | Route 2 | 14.6 | 40.8 | 9.7 | 21.6 | 16.9 | 45.1 |
| F7 | cellulose | Route 2 | 14.6 | 40.8 | 12.6 | 36.0 | 15.6 | 42.6 |
| F8 | cellulose | Route 2 | 14.6 | 40.8 | 13.8 | 40.1 | 16.0 | 44.0 |

TABLE 2

| Fiber | $F_{Max,2}$ | $\delta_{Max,2}$ | $W_{Max,2}$ |
| --- | --- | --- | --- |
| A | 564 | 422 | 284 |
| D | 861 | 760 | 261 |
| B | 531 | 420 | 259 |
| C | 581 | 363 | 214 |

Surface Modification and Treatment of Fibers

EXAMPLES

Example F1

4 L Ethanol, 8 g 3-aminopropyltriethoxysilane and 10 mL conc. ammonium hydroxide solution were put in a reaction vessel and stirred. 80 g polyvinylalcohol fiber were suspended in this as prepared mixture. After storing for 5 h at room temperature the fibers were separated from the liquid, washed and dried at 70° C. for 16 h.

Example F2

1.5 g Phosphonated polypropylene, prepared from triethylphosphit and chlorinated polypropylene followed by acidic hydrolysis, was dissolved in 500 mL methyl-tertbutyl ether. Then 25 g polypropylene (PP) fibers were added and stored for 5 h in the mixture at room temperature before the fibers were separated from the liquid, washed and dried at 70° C. for 16 h.

Example F3

20 g PP fibers were suspended in 1.4 L chloroform, 15 g n-bromo succinimide and 2.0 g dibenzoyl peroxide were added and the mixture was heated to 60° C. to maintain a gentle reflux. After 1 h the mixture was cooled down to room temperature for 2.5 h. The fibers where then separated from the liquid compounds, washed with methyl-tertbutyl ether and dried at room temperature.

Then, the fibers were mixed with 500 mL diethylene triamine and heated for 5 h at 90° C. Afterwards, the fibers were washed with methyl-tertbutyl ether and dried at room temperature.

Example F4

20 g PP fibers were suspended in a solution of polyvinylamine-polypropylene copolymer (VP PR 8358 X; BASF) in 600 g water and heated to 60° C. for 8 h. The mixture was then allowed to cool down to room temperature slowly. The fibers were separated, washed with water and dried at 60° C.

Example F5

4 L Ethanol, 8 g 3-aminopropyltriethoxysilane and 10 mL conc. ammonium hydroxide solution were put in a reaction vessel and mixed. 25 g basalt fiber were suspended in this mixture. After storing for 5 h at room temperature the fibers were separated from the liquid, washed with ethanol and dried at 70° C. for 16 h.

Example F6

700 mL THF and 5 g ammonium polyphosphate were put in a reaction vessel and stirred. 42.5 g viscose fibers were suspended in this prepared mixture. After stirring for 5 h in boiling THF the fibers were separated from the liquid, washed and dried at 70° C. for 16 h.

Example F7

1.5 L acetone, 4.5 g 1,4-butanosultone and 4.5 g sodium hydroxide were put in a reaction vessel and stirred. 45 g viscose fibers were suspended in this prepared mixture. After stirring for 5 h in boiling acetone the fibers were separated from the liquid, washed and dried at 70° C. for 16h.

Example F8

1.5 L isopropanol, 5.8 g sodium chloroacetate and 2-1 g sodium hydroxide were put in a reaction vessel and stirred. 30 g cellulose fibers were suspended in this prepared mixture. After stirring for 5 h in boiling isopropanol the fibers were separated from the liquid, washed and dried at 70° C. for 16h.

Example F9

96 g tetrahydrofurane, 0.5 g sulforylchloride and 5 g polyvinylalcohol fiber was stirred for 8 h at room temperature. Afterwards the fibers were filtered, washed with toluene and water and dried for 1 h at 60° C.

Example F10

150 g cyclohexane, 1 g aminoacetaldehyde dimethylacetale and 0.2 g methansulfonic acid mixed together, 10 g polyvinylalcohol fibers were added. The mixture was heated in a Dean-Stark apparatus (water separator) for 3 h and 120 mL cyclohexane containing small amounts of methanol-byproduct was distilled off and same amount of cyclohexane was freshly added to the fibers continuously. Then the fibers were filtered and washed with water, saturated sodium carbonate solution, again washed with water and dried at 60° C. for 16 h.

Example F11

96 g tetrahydrofurane, 0.5 g phosphorous oxychloride and 5 g polyvinylalcohol fiber was stirred for 8 h at room temperature. Afterwards the fibers were filtered, washed with toluene and water and dried at 60° C. for 1 h.

Example F12

100 g tetrahydrofurane, 0.25 g sulforylchloride and 5 g cellulose fiber (Lyocell) was stirred for 8 h at room temperature. Afterwards the fibers were filtered, washed with toluene and water three times each and dried for 16h at 60° C.

Example F 13

5 g of glass fiber were dispersed in 100 mL ethanol. Then, 0.5 mL of aminopropyltriethoxysilane were added together with 0.1 microliter of 33 wt % ammonia solution. The Mixture was stirred for 16h at room temperature. Then the fibers were filtered off and dried at 40° C. for 16 h.

Attachment of Seed Particles to Fibers

The modification of fibers may be carried out in two different ways:
1. synthesis of seeding material separately, followed by storage of fibers in suspension containing seeding material, or
2. direct synthesis of seeding material in suspension containing modified fibers.

Example SP1

Production of Modified Fibers after Route 1

As seeding material polymer stabilized CSH was produced after following procedure:

Polymer 1: MVA® 2500 (BASF):

Polymer 1 is a comb shaped polymer based on the monomers maleic acid, acrylic acid and vinyl-O-butyl polyethyleneglycol-5800. The molar ratio acrylic acid/maleic acid is 7. Mw=40.000 g/mol determined by gel permeation chromatography (GPC). The solid content is 45.1 weight-% (wt %). The charge density is 930 µeq/g polymer.

Polymer 2: Polyarylether

The comb polymer Polymer 2 is produced by polycondensation of phenol-polyethyleneglycol 5000 and phenoxy-ethanolphosphate. The molecular weight is 23.000 g/mol as determined by GPC. The solid content is 35 wt %. The charge density is 745 µeq/g polymer.

40.3 g Calciumacetate (100%) was dissolved in 231 g $H_2O$ resulting in solution 1. Solution 2 was obtained by dissolving 47.2 g Na-metasilicate-pentahydrate in 133.2 g $H_2O$.

In a reactor solution 3 was obtained by mixing 65.4 g of Polymer 1 (polymer suspension with 45.1 wt % solid content), 22.8 g of Polymer 2 (polymer suspension with 35 wt % solid content) and 460 g water. Within 50 minutes solution 1 and solution 2 were slowly added to solution 3 in the reactor. The suspension was stirred constantly at 400 rpm.

After production of the suspension containing CSH seed particles stabilized by polymers 1.5 g of fiber (non-modified or modified with different functionalities) were stored in 250 g of the CSH seed particle suspension (solid content ~11 wt %). The beaker was sealed with a film. Storage time was varied between 1 hour and 24 hours. After storage fibers were separated from the suspension by filtration and washed 2 times with 50 ml of 0.005 n $Ca(OH)_2$-solution. Finally fibers were dried at 60° C. in a drying oven.

Production of Modified Fibers after Route 2:

The synthesis of CSH seed particles as described in Route 1 was done in a comparable way with the exception that the modified fiber was present in solution 3 during the synthesis of the CSH seed particle suspension. 1.5 g of fibers were added to solution 3.

Additionally, the synthesis of the CSH seed particle suspension was done without usage of comb polymer as stabilizers. In this case the solution 3 contains only 180.5 g water. After synthesis of the CSH seed particles fibers were separated from the suspension by filtration and washed 2 times with 50 ml of 0.005 n $Ca(OH)_2$-solution each. Finally fibers were dried at 60° C. in a drying oven.

Results

The effects of the CSH seed particles were studied by isothermal heat flow calorimetry. For the investigation 1.5 wt % of the fibers by weight of cement were mixed with cement with a water/cement ratio of 0.4. The measurements were performed at 20° C. The measurements were done with the original fiber as control and with the modified fiber and with added CSH seed particles.

FIG. 1 and table 1 present and summarize the results for the heat flow calorimetry comparing control vs. seed particle modified fibers.

Example SP2

Production of Modified Fibers after Route 2

5 g of polypropylene Masterfibers™ 100 (BASF) coextruded with ~1 wt % of amorphous fumed silica (diameter: 40 μm; length: 12.7 mm) were deposited in 600 mL 0.005 m $Ca(OH)_2$ solution for 2 hours. The treated fiber was filtered and redispersed in 965.72 g water and 129.96 g MVA® 2500 (BASF). 543, 41 g of solution 1 (120.12 g calcium acetate dissolved in 695.00 g water) and 360.96 g of solution 2 (141.84 g $Na_2SiO_{3*5}$ $H_2O$+399.60 g water) were, in the course of 100 minutes slowly added to solution 1.

Figure 2:
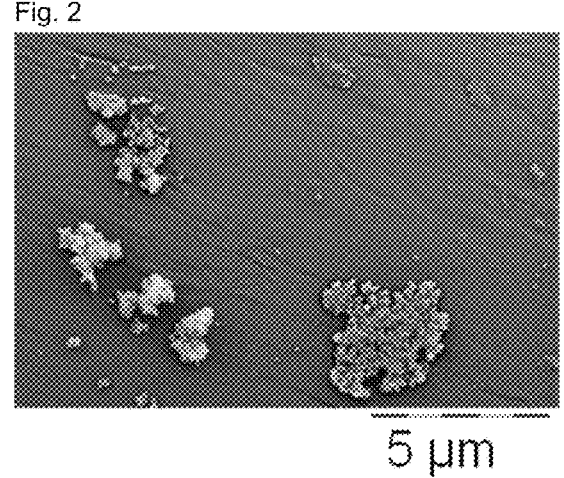
FIG. 2: Scanning electron microscopy (SEM) micrograph of the CSH seed particle on a modified polypropylene fiber

After synthesis of CSH seed particles fibers were separated from the suspension by filtration and washed 2 times with 200 mL ethanol. Finally fibers were dried at 60° C. in a drying oven. The increase in weight caused by CSH crystallization on the fibers was round 1 wt %. Scanning electron microscopy (SEM) verified that CSH seed particles were attached to the fiber surface (FIG. 2).

Comparative Example

For the preparation of ettringite coated fiber (E) 30 g polypropylene fibers (30 micrometer diameter; 12.7 mm length) were deposited in 30 mL water, initially stirred for 30 min at 200 rpm, followed by the addition of 5.4 g $Ca(OH)_2$ and further stirring of the suspension for another 20 min. For ettringite precipitation a solution of 8.1 g $Al_2(SO_4)_3$*18 $H_2O$ was dissolved in 60 g water and added to the fiber-suspension and stirred at 150 rpm for 30 min. The resulting suspension was filtered through a paper-filter and the wet fibers dried under ambient conditions.

Figure 3:
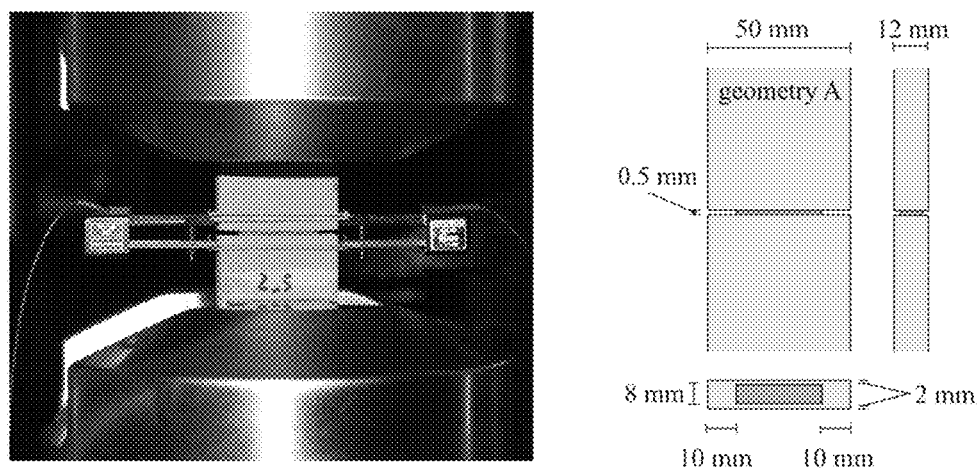
FIG. 3: Notched Coupon Test setup (left) and test specimen geometry (right)

The Notched-Coupon-Test is used as mechanical test method to demonstrate fiber adhesion and pull-out behavior of fiber in cementitious binder systems. The test specimens, prisms with specific dimensions (see FIG. 3) were prepared with mortar containing control fibers and seed particle modified fibers. 10 test specimens have been prepared for each individual fiber composition tested. The fiber dosage was 1 vol % if nothing else is explicitly mentioned. The prepared specimen are stripped after one day and stored under water at 20° C. for another 27 days to provide a total hydration time of 28 days. The prisms are then polished and a notch of only 0.5 mm is introduced. The test specimens were then tested in the tensile test apparatus. Within the measurement, the test prism is pulled apart and the notch simulates a single crack. The results of the measurements are diagrams showing the load (N) at a specific crack opening (μm). 5-10 specimens have been tested for each system.

Preparation of Microfiber/Mortar Composites for Testing:

430 g Portland cement, 880 g fly ash, 150 g quartz sand (0-0.3 mm), 150 g quartz flour, 300 g water and 4.3 g superplastiziser (Melflux® 2641; BASF) as well as 0.5 g stabilizer are mixed. followed by the addition of the respective fibers. The mortar quality is tested optically for the existence of lumps or if the fibers are screwed around the mixer. A subsequent slump tests shows the flow behavior of the fiber filled mortar paste and finishes the workability test. The prepared composite blocks all have shown good to acceptable behavior in the workability test.

Figure 4:
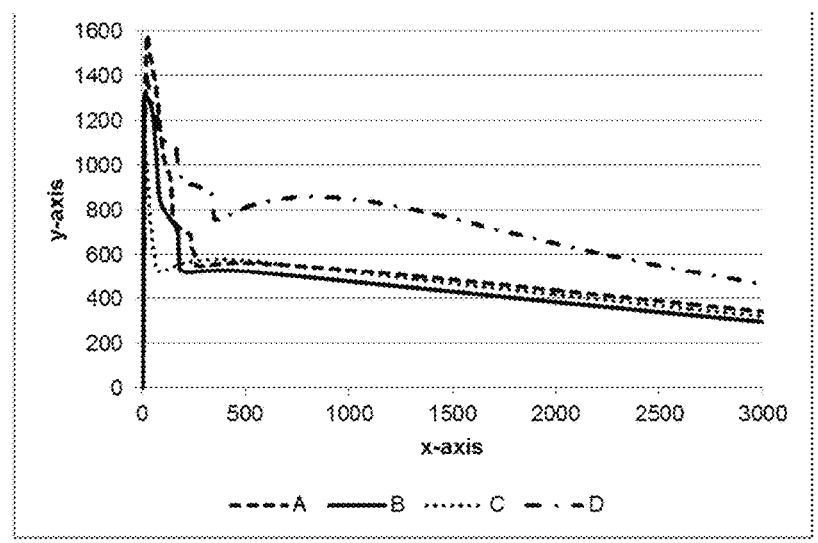
FIG. 4: Notched Coupon Test results of polypropylene fibers (A: PP fiber reference (coextruded with fumed silica); B: PP fiber (coextruded with fumed silica) and addition of an extra amount of CSH powder in the mortar (1 wt % with respect to the fiber content); C: PP fiber (coextruded with fumed silica) and addition of an extra amount of CSH powder in the mortar (2 wt % with respect to the fiber content); D: CSH modified PP fiber (coextruded with fumed silica); x-axis: crack opening [µm], y-axis: load [N])
Figure 5:
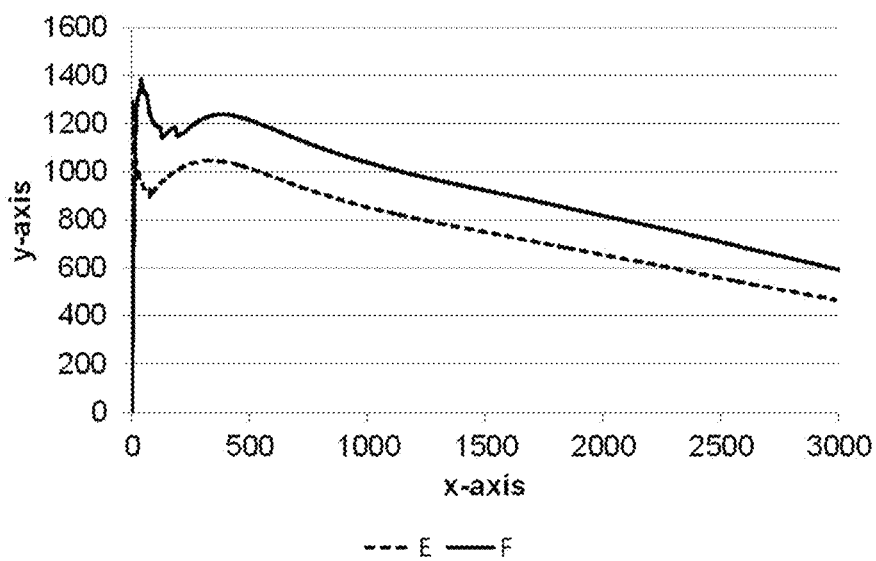
FIG. 5: Notched Coupon Test results of polypropylene fibers with (E) and without (F) ettringite precipitate; x-axis: crack opening [µm], y-axis: load [N])

Results of the Application Tests:

The CSH modified polypropylene fiber (coextruded with amorphous fumed silica) showed an increase in $F_{Max,2}$, $\delta_{Max,2}$ and $W_{Max,2}$ in comparison to the unmodified fiber (FIG. 4 and Table 2). The increase of the $F_{Max,2}$, $\delta_{Max,2}$ and $W_{Max,2}$ values was due to the CSH seed particles on the fiber surface, since the application test with the pristine polypropylene fibers (coextruded with fumed silica) and additional CSH powder (1 wt % referring to the fiber content) did not show any improvement. Moreover an increase of the CSH powder content to 2 wt % also did not result in any benefit. Ettringite coated fibers (E) performed even worse when compared to unmodified fiber (FIG. 5)

Example SP3

Production of Modified Fibers after Route 2

2.5 g of polyvinylalcohol fibers modified with phosphate anchor groups (F 11 (diameter: 13 μm; length: 6 mm) were dispersed in 482.94 g water and 64.98 g MVA® 2500 (BASF). 271.7 g of solution 1 (70.9 g Calciumacetat dissolved in 199.81 g water) and 180.6 g of solution 2 (60.1 g $Na_2SiO_3$*5 $H_2O$+347.5 g water) were slowly dosed into solution 1 in a period of 50 minutes.

Figure 6:
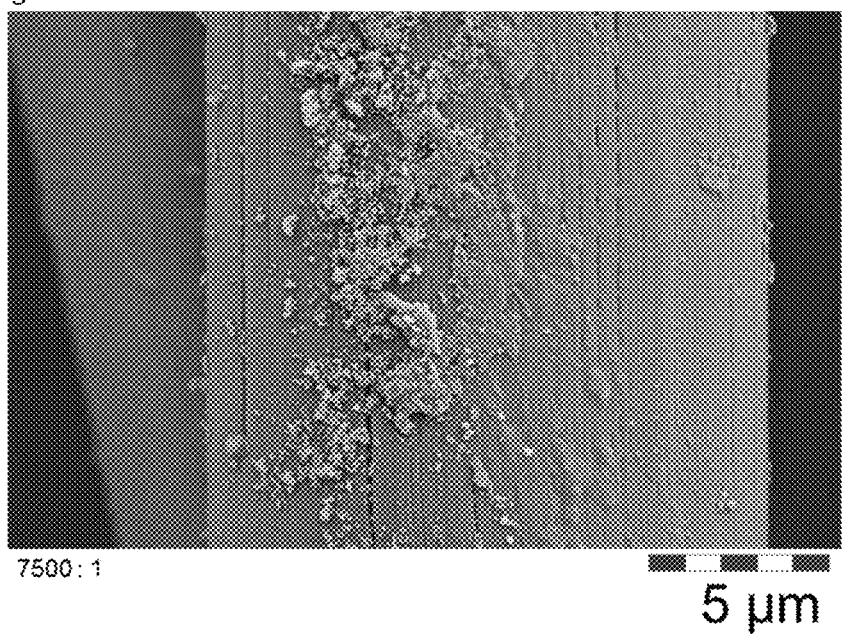
FIG. 6: SEM micrograph of the CSH seed particle on a modified polyvinylalcohol fiber

After synthesis of CSH seed particle fibers were separated from the suspension by filtration. Afterwards fibers were washed for 2 times with 100 mL ethanol. Finally fibers were dried at 60° C. in a drying oven. The increase in weight caused by CSH crystallization on the fibers was round 3 wt %. SEM micrograph (FIG. 6) also verifies that CSH seeds were attached to the fiber surface.

Example SP4

Calcium Sulfate Dehydrate Seed Particles on the Surface of a Polyvinylalcohol (PVA) Fiber Modified with Sulfate Anchor Groups (F9)

2.5 g of the fibers (modified with phosphate groups) were dispersed in 200 mL of a 0.1 m $MgSO_4$ solution and in 200 mL of a 0.1 m $CaCl2$ solution. 300 g of a 0.15 molar $MgSO_4$ solution and 300 g of a $CaCl2$ solution were dosed in parallel to the fiber in 45 minutes. After the addition of 100 g of the 0.15 molar solutions 0.46 g Melflux® 2650 L (BASF; SC=32.5 wt %) are added. After a further addition of 100 g of the 0.15 molar solutions accessory 0.40 g Melflux® 2650 L (BASF; SC=32.5 wt %) were dosed to the reaction.

Figure 7:
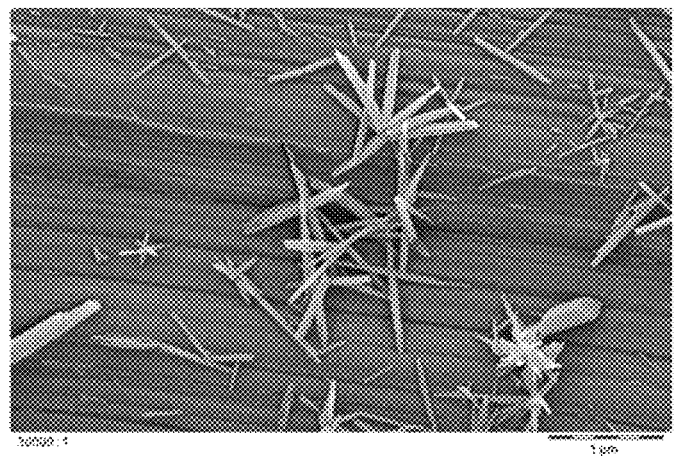
FIG. 7: SEM micrograph of the gypsum calcium disulfate seed particle on a modified poyvinylalcohol fiber Table 1: Heat of hydration values (HoH) are represented as integrals of different heat flow measurements (see examples F1-F8) up to 6 h (HoH-6h) and 10 h (HoH-10h) (see FIG. 1). The modification of the fiber surface with different anchor groups or linkers influences the heat of hydration in most cases in a negative way. The CSH modification shows a shift of the heat flow measurements towards earlier hydration times in comparison with the reference system.

After synthesis of gypsum seeds on the PVA fibers they were separated from the suspension by filtration. Afterwards fibers were washed for 2 times with 100 mL ethanol. Finally fibers were dried at 40° C. in a drying oven. SEM micrograph FIG. 7 shows gypsum seeds on the fiber surface.

The invention claimed is:

1. A plurality of individual fiber bodies having attached to the surface of such individual fiber bodies crystallization seeds wherein the crystallization seeds are attached to the individual fiber bodies via linker moieties, wherein the crystallization seeds are attached to the individual fiber bodies via covalently bound linker moieties in the presence of comb polymer, wherein the linker moieties are selected from one or more functional groups containing an amine, amide, phosphate or phosphonate functionality, and wherein the crystallization seeds are selected from calcium silicate hydrate, ettringite, or calcium sulfate dihydrate.

2. The plurality of individual fiber bodies of claim 1, wherein the size of the crystallization seeds is between 1 nm 10 µm.

3. The plurality of individual fiber bodies of claim 1, wherein the fiber bodies are selected from at least one of cellulose-based fiber, mineral-based fiber, carbon, metal-based fiber, or synthetic polymer-based fiber.

4. The plurality of individual fiber bodies of claim 1, wherein the fiber bodies are selected from polyvinylalcohol, polypropylene, cellulose, glass or mixtures thereof.

5. A method for the preparation of the plurality of individual fiber bodies of claim 1, wherein the individual fiber body surface is modified and contacting crystallization seeds with said modified individual fiber bodies.

6. The method of claim 5 wherein the individual fiber body surface is modified by treatment with a reagent creating one or more linker moieties on the fiber surface.

7. A method for the preparation of the plurality of individual fiber bodies according to claim 5, wherein
   (a) fibers are treated with a solution obtained by combining individually prepared solutions of a water-soluble calcium compound (Solution I) and a water-soluble silicate or sulfate compound (Solution II), optionally separately to a solution of a water-soluble comb polymer (Solution III) or
   (b) individually prepared Solution I and Solution II are added optionally separately to fibers suspended in Solution III.

8. A method comprising utilizing the plurality of individual fiber bodies of claim 1 for reinforcement of inorganic binder compositions.

9. A method for enhancement of bonding between fibers and an inorganic binder composition characterized by utilizing the plurality of individual fiber bodies according to claim 1.

10. An inorganic binder composition, comprising, hydraulic, latent hydraulic or non-hydraulic binders and the plurality of individual fiber bodies of claim 1.

11. The inorganic binder composition of claim 10 wherein, in said plurality of individual fiber bodies, said individual fiber bodies are separated from each other.

12. The inorganic binder composition of claim 10, wherein said plurality of individual fiber bodies are selected from polyvinylalcohol, polypropylene, cellulose or glass.

13. The inorganic binder composition of claim 10, wherein said composition is a cementitious material.

14. The inorganic binder composition of claim 10, further comprising a plasticizer, water reducer, air entrainer, air detrainer, corrosion inhibitor, set accelerator, set retarder, shrinkage reducing admixture, fly ash, silica fume, or a mixture thereof.

15. A structure reinforced with the plurality of individual fiber bodies of claim 1.

16. The structure according to claim 15, being made of a material selected from a non-hydraulic, plaster material or hydraulic, cementitious material, mortar or concrete.

17. The structure according to claim 16, being made of concrete.

18. A crack-resistant, high tensile strength shaped article comprising the inorganic binder composition concrete material as defined by claim 10.

19. The plurality of individual fiber bodies of claim 1, wherein the linker moieties are selected from one or more amphiphilic molecule containing amine, ammonium, amide, nitrate, sulfate, sulfonate, sulfonamide, carboxylate, silanol, phosphate, phosphinate or phosphonate groups.

20. The plurality of individual fiber bodies of claim 1, wherein the size of the crystallization seeds is between 5 nm 1.5 µm.

21. The plurality of individual fiber bodies of claim 1, wherein the size of the crystallization seeds is between 10 nm-300 nm.

22. The plurality of individual fiber bodies of claim 1, wherein the size of the crystallization seeds is between 10 nm and 100 nm.

23. The plurality of individual fiber bodies of claim 3, wherein the fiber bodies are selected from at least one of cotton, viscose, hemp, jute, sisal, abaca, bamboo, cellulose, regenerated cellulose, glass, mineral wool, basalt, oxide ceramic, steel, polyamide, polyester, polyvinylalcohol, aramide, polyethylene, polypropylene, polyoxymethylene, poly(vinylidene fluoride), poly(methylpentene), poly(ethylene-chlorotrifluoroethylene), poly(vinylfluoride), poly(ethyleneoxide), poly(ethyleneterephthalate), poly(butylenterephthalate) or polybutene.

* * * * *